United States Patent
Zhang et al.

(10) Patent No.: US 12,225,573 B2
(45) Date of Patent: Feb. 11, 2025

(54) SYSTEM AND METHOD FOR DETERMINING UPLINK TRANSMISSION PRIORITY

(71) Applicant: ZTE CORPORATION, Guangdong (CN)

(72) Inventors: Chenchen Zhang, Shenzhen (CN); Peng Hao, Shenzhen (CN); Xingguang Wei, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 369 days.

(21) Appl. No.: 17/388,331

(22) Filed: Jul. 29, 2021

(65) Prior Publication Data

US 2021/0360648 A1 Nov. 18, 2021

Related U.S. Application Data

(63) Continuation of application No. PCT/CN2019/075216, filed on Feb. 15, 2019.

(51) Int. Cl.
*H04W 72/00* (2023.01)
*H04W 52/36* (2009.01)
*H04W 72/23* (2023.01)
*H04W 72/56* (2023.01)
*H04W 72/044* (2023.01)

(52) U.S. Cl.
CPC ........... *H04W 72/56* (2023.01); *H04W 52/36* (2013.01); *H04W 72/23* (2023.01); *H04W 72/0473* (2013.01)

(58) Field of Classification Search
CPC ..... H04W 72/56; H04W 72/23; H04W 52/36; H04W 72/0473
See application file for complete search history.

(56) References Cited

U.S. PATENT DOCUMENTS

| 11,388,683 | B2* | 7/2022 | Ohara | H04W 52/48 |
| 2012/0300715 | A1* | 11/2012 | Pelletier | H04W 74/0891 370/329 |
| 2013/0215811 | A1* | 8/2013 | Takaoka | H04W 52/30 370/311 |

(Continued)

FOREIGN PATENT DOCUMENTS

| CN | 104427604 A | 3/2015 |
| CN | 108377552 A | 8/2018 |

OTHER PUBLICATIONS

Huawei et al.: "Power control for CA and DC" 3GPP TSG RAN WGI Meeting #88bis; RI-1704197; Apr. 7, 2017; Spokane, USA (5 pages).

(Continued)

*Primary Examiner* — Erika A Washington
(74) *Attorney, Agent, or Firm* — Foley & Lardner LLP

(57) ABSTRACT

Methods, systems, and devices for determining priority of transport channels and transmission signals. Some embodiments can be used in wireless communication embodiments in which multiple uplink transport channels or transmission signals need to be concurrent transmitted, such as in dual-connectivity mode, where the determined priority can be used to preferentially allocate uplink transmit power to higher priority transport channels and transmission signals.

19 Claims, 5 Drawing Sheets

(56) References Cited

U.S. PATENT DOCUMENTS

| | | | | |
|---|---|---|---|---|
| 2014/0269454 | A1* | 9/2014 | Papasakellariou | H04W 52/34 370/280 |
| 2015/0208366 | A1* | 7/2015 | Papasakellariou | H04W 52/146 370/311 |
| 2015/0208404 | A1* | 7/2015 | Yie | H04W 76/15 370/329 |
| 2015/0282104 | A1* | 10/2015 | Damnjanovic | H04W 52/365 455/522 |
| 2016/0234788 | A1* | 8/2016 | Noh | H04W 52/146 |
| 2016/0309427 | A1* | 10/2016 | Cho | H04W 52/146 |
| 2016/0353387 | A1* | 12/2016 | Gao | H04W 52/346 |
| 2017/0230843 | A1* | 8/2017 | Ouchi | H04W 52/367 |
| 2017/0230913 | A1* | 8/2017 | Ouchi | H04W 74/0833 |
| 2017/0303212 | A1* | 10/2017 | Takeda | H04W 16/32 |
| 2018/0324850 | A1* | 11/2018 | Amuru | H04B 7/088 |
| 2019/0082449 | A1* | 3/2019 | Kim | H04W 72/0473 |
| 2019/0215781 | A1* | 7/2019 | Jeon | H04W 76/32 |
| 2019/0230602 | A1* | 7/2019 | Gao | H04W 52/346 |
| 2020/0059867 | A1* | 2/2020 | Haghighat | H04W 52/285 |
| 2020/0163023 | A1* | 5/2020 | Pelletier | H04W 52/38 |
| 2020/0220680 | A1* | 7/2020 | Yamada | H04W 72/23 |
| 2020/0359338 | A1* | 11/2020 | Osawa | H04W 52/18 |
| 2021/0022083 | A1* | 1/2021 | Takahashi | H04W 52/146 |

OTHER PUBLICATIONS

International Search Report and Written Opinion for PCT Appl. No. PCT/CN2019/075216, mailed Oct. 28, 2019 (7 pages).

* cited by examiner

SYSTEM AND METHOD FOR DETERMINING UPLINK TRANSMISSION PRIORITY

CROSS-REFERENCE TO RELATED APPLICATION

This application claims the benefit of priority under 35 U.S.C. § 120 as a continuation of PCT Patent Application No. PCT/CN2019/075216, filed on Feb. 15, 2019, the disclosure of which is incorporated herein by reference in its entirety.

TECHNICAL FIELD

This document is directed generally to wireless communications.

BACKGROUND

Wireless communication technologies are moving the world toward an increasingly connected and networked society. The 5th Generation (5G) New Radio (NR) network brings with it vast improvements in several areas including throughput, reliability, and coverage. End user devices such as smartphones, customer premise equipment, terminal equipment, embedded cellular radios, etc., increasingly require both high performance and low power operation. Additionally, not only can the power available for transmission by such end user devices be limited, the network or the device can further limit the transmit power, for example, to mitigate interference from or to other devices. Efficient and effective transmit power control is therefore an important aspect 5G NR systems.

SUMMARY

This document relates to methods, systems, and devices for determining transport channel or transmission signal priority for multiple concurrent transmissions such as in NR-NR dual connectivity transmissions.

In one example aspect, a wireless communication method of a wireless communication device is disclosed. The method includes allocating uplink transmission power to one or more transport channels or transmission signals based on a priority of the transport channels or transmission signals. The priority of transport channels or transmission signals can be determined based on, for example, the cell group type (e.g., if the channel or signal is transmitted in a master cell group or secondary cell group) or cell group priority of the cell groups of the channels or signals, the cell type of the channels or signals (e.g., if the channel or signal is in a primary cell or secondary cell), the time domain resources of the channels or signals, the transmission type of the channel or signals (and corresponding priorities of the different transmission type), among others criteria described further below.

In another example aspect, a wireless communication apparatus comprising a processor is disclosed. The processor is configured to implement the above-described method.

In another example aspect, a computer program product is disclosed. The computer program product includes a computer-readable medium that stores processor-executable instructions embodying the above-described method.

The above and other aspects and their implementations are described in greater detail in the drawings, the descriptions, and the claims.

DETAILED DESCRIPTION

Figure 1:
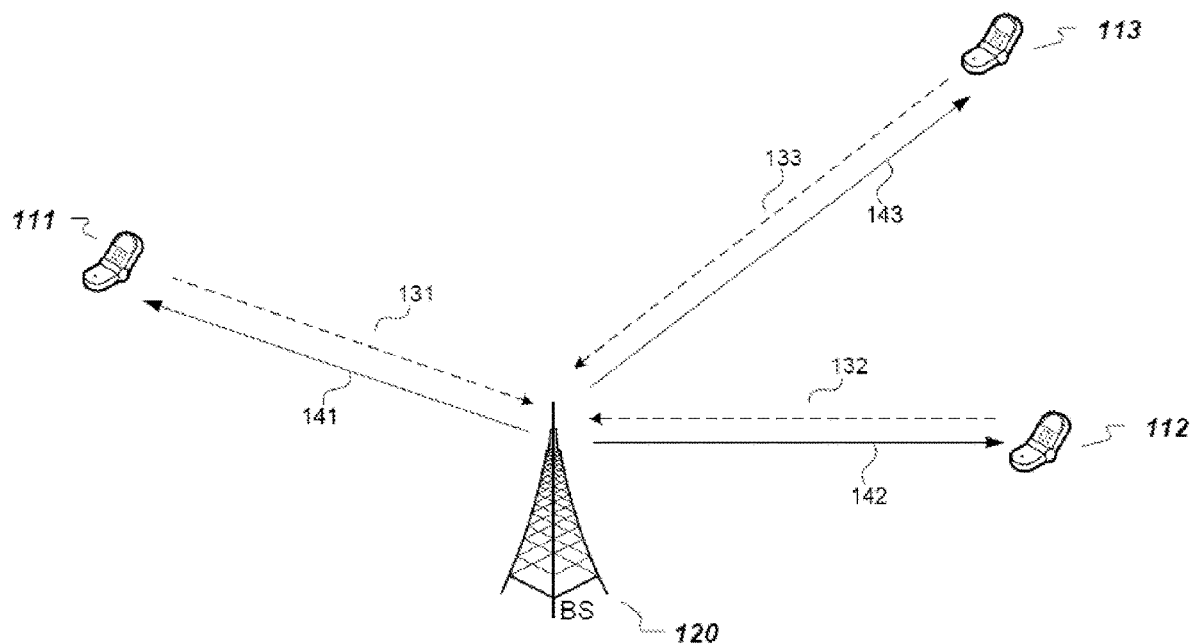
FIG. 1 shows an example of a base station (BS) and user equipment (UE) in wireless communication.

There is an increasing demand for fourth generation of mobile communication technology (4G, the 4th Generation mobile communication technology), Long-term evolution (LTE, Long-Term Evolution), and fifth-generation mobile communication technology (5G, the 5th Generation mobile communication technology) also called NR (New Radio).

One of the ways to improve performance in 5G NR systems is to use a dual connectivity mode where a wireless device (e.g., a UE) establishes two or more links with two or more NR cell groups (CGs), i.e., NR-NR DC (New Radio, New Radio Dual Connectivity). Because in NR-NR DC mode the time domain transmission resources of multiple uplink channels or signals can partially or completely overlap, there is a need to determine a set of priority rules among multiple channels or signals of multiple cell groups. The UE can then use this set of priority rules to arbitrate the allocation of possibly limited transmit power to the channels or signals, the transmit power should be assigned to the higher priority channels or signals. In other embodiments, the determined priorities can be used for other scheduling aspects in addition to power allocation. This greatly improves system performance.

One of the ways that has been suggested to prioritize the allocation of limited UL transmit power to UL transmit channels or signals in carrier aggregation mode (CA) when the UE needs to transmit multiple UL channels or signals with full or partial overlap in the time domain is as follows:

1. Within a cell group (CG) which could be either the master cell group (MCG) or a secondary cell group (SCG):
   a. PRACH (Physical Random Access Channel) on primary cell has the highest priority;
   b. PUCCH (Physical UL Control Channel) with HARQ-ACK/SR (Hybrid Automatic Repeat Request-Acknowledge/Scheduling Request) has the same priority as PUSCH (Physical UL Shared Channel) with HARQ-ACK), and these have the next highest priority;
   c. PUCCH with CSI (Channel State Information) has the same priority as PUSCH without CSI, and these have the next lower priority;
   d. A-SRS (Aperiodic Sounding Reference Signal) has the next lower priority;
   e. P-/SP-SRS (Periodic or Single SRS) has the same priority as PRACH on secondary cell which have the lowest priority.

2. The priority when transmitting on the primary cell in a CG (MCG or SCG) for the same type of uplink transmission channel or signal is greater than the priority when transmitting in the secondary cell.
3. The priority when transmitting on the primary uplink channel or signal on the primary cell of the MCG is higher than the priority when transmitting on the primary cell of the SCG.

However, the suggested priority rules described above do not adequately address systems that support multiple services because these priority rules do not adequately cater to the needs of different users or applications (or network slices). For example, ultra-reliable low latency communication (URLLC) applications typically require higher latency than enhanced mobile broadband (eMBB) applications and so wireless devices configured for URLLC might require different priority for UL channels or signals than devices configured for eMBB. It is therefore beneficial to have a method for UL transmit power allocation that can meet the demands of various service requirements or wireless device configurations. That is, when the system supports service multiplexing of multiple transmission types, the system can better decide which transmission type or signal transmission power is preferentially assigned to the terminal.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

FIG. 1 shows an example of a wireless communication system (e.g., an LTE, 5G or New Radio (NR) cellular network) that includes a BS 120 and one or more user equipment (UE) 111, 112 and 113. The uplink transmissions (131, 132, 133) can include various transport channels, various transmission signals, and varying amounts of power available to transmit the channels and signals as disclosed in this document. The UE can be, for example, a smartphone, a tablet, a mobile computer, a machine to machine (M2M) device, a terminal, a customer premise equipment, a mobile device, an Internet of Things (IoT) device, and so on.

Figure 2:
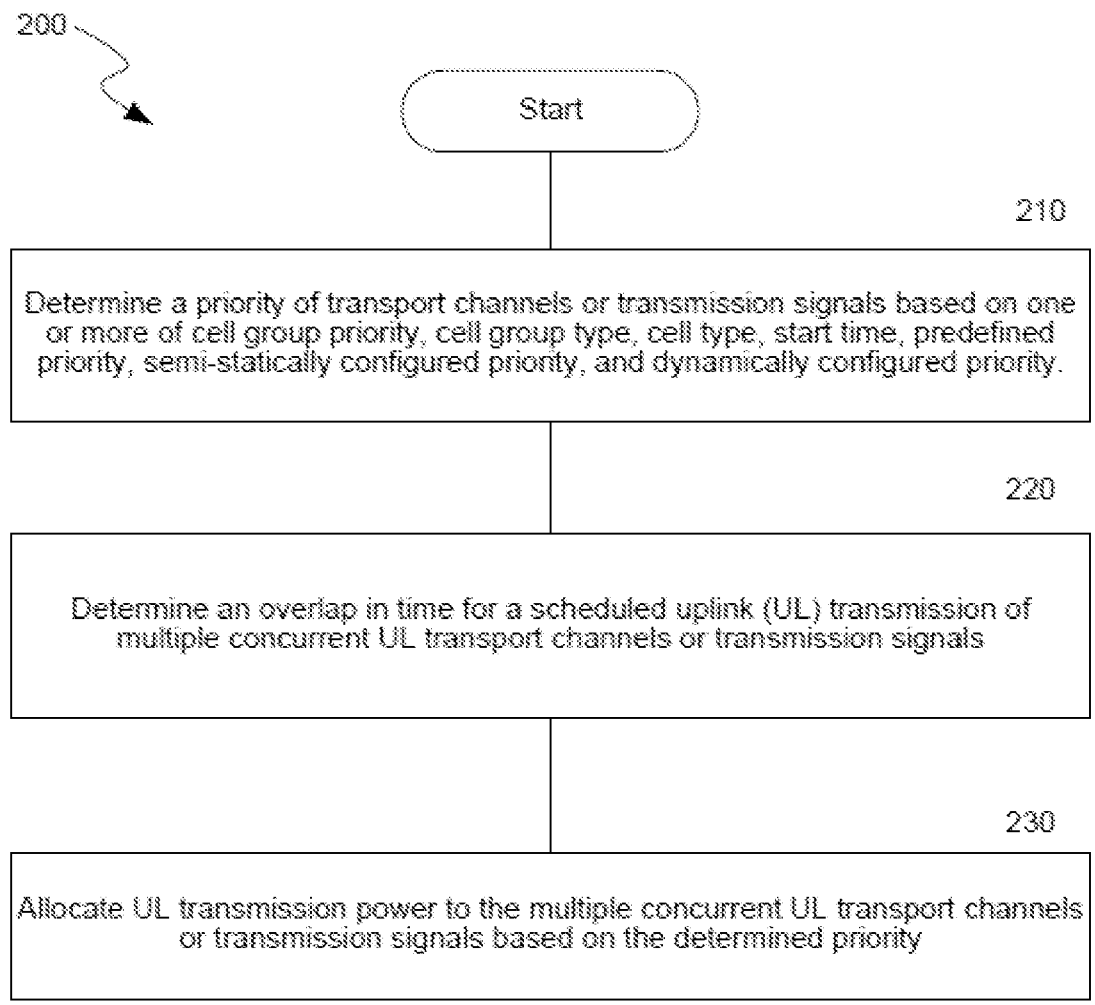
FIG. 2 shows a representative flow illustrating a method for determining transport channel or transmission signal priority.

FIG. 2 shows a representative flow 200 illustrating a method for determining transport channel or transmission signal priority. At block 210 a wireless device (e.g., a UE) or a wireless node (e.g., a base station) determines a priority of transport channels or transmission signals based on a one or more factors including, for example, a cell group priority of the cell group that the channel or signals are in, a cell group type of the channels or signals (e.g., whether it is a master cell group or a secondary cell group), a cell type of the channels or signals (e.g., whether it is a primary cell or a secondary cell), a start time of the channels or signals (in some embodiments described below, the start time determines the priority of the cell group), or a preconfigured or dynamically configured priority of the channels or signals (e.g., a system defined, higher layer signaled or control channel defined priority order configuration of the transport channels or transmission signals). How the priority is determined in various embodiments is described in more detail below.

At block 220, the UE or BS determines if there is an overlap in time for scheduled UL grants (i.e., if multiple channels or signals need to be transmitted at the same time, for example, in dual-connectivity mode). If there are multiple channels or signals that overlap in time, the UE determines if the total power allocated for UL transmission is sufficient to transmit all the scheduled UL channels or signals.

At block 230, the UE allocates UL transmission power to the multiple concurrent UL transport channels or transmission signals based on the determined priority. For example, if the total power allocated for UL transmission is insufficient to transmit all the scheduled UL channels or signals, higher priority channels and signals are allocated power first and the residual power is allocated to lower priority channels or signals (if there is no residual power, lower priority channels or signals can be discarded). This is described further in relation to example embodiments below.

Figure 3:
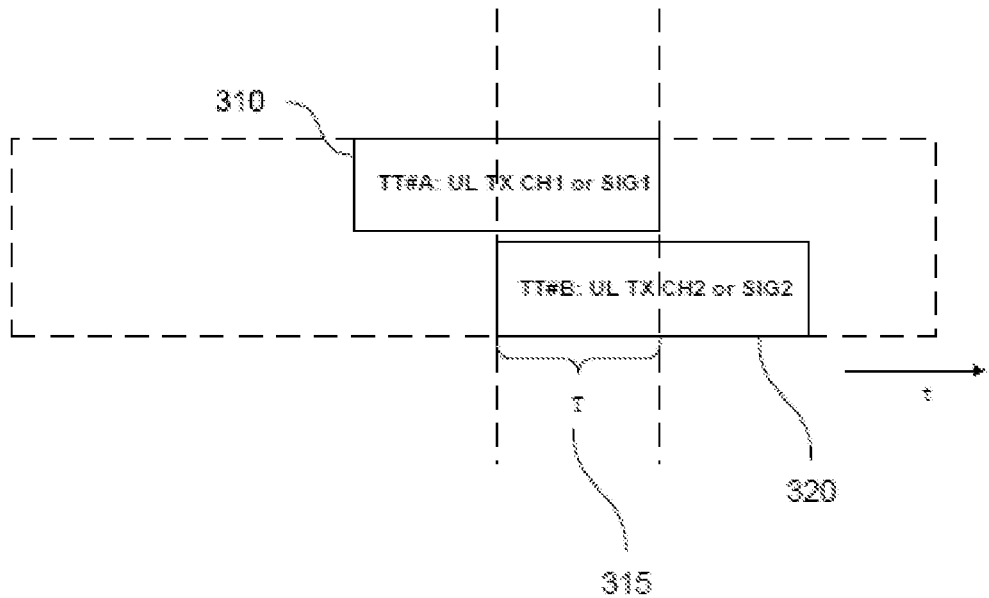
FIG. 3 shows an example block diagram illustrating a time overlap of different transport channels or transmission signals of different transmission types.

FIG. 3 shows an example block diagram illustrating a time overlap 315 of UL transport channel 1 or transmission signal 1 (of transmission type A) 310, and UL transport channel 2 or transmission signal 2 (of transmission type B) 320.

1 Determining Priority Based on Transmission Type

A wireless device (e.g., UE 111, 112, or 113 in FIG. 1) can be configured with a variety of transmission types where each of the transmission types can have a different priority. For example, transmission type A ("TT #A") can have a higher priority than transmission type B ("TT #B") which can have a higher priority than transmission type C ("TT #C"), etc.

1.1 Representative Embodiments for Priority Ordering of Different Transport Channels and Transmission Signals of Different Transmission Types In some embodiments, each transmission type can relate to multiple transport channels or transmission signals. The priority of the different channels or signals within the same transmission type can be different. For example, if transmission type A (TT #A) has transport channel 1 ("CH1"), transport channel 2 ("CH2"), transmission signal 3 ("SIG3"), and transmission signal 4 ("SIG4"), the priority rule can be such that a lower numbered transport channel or transmission signal has a higher priority than a higher numbered channel or signal (i.e., transport channel 1 has higher priority than transport 2 which has higher priority than transmission signal 3, etc.). That is, all the transmission signals and transport channels within a transmission type can be assigned a priority ordering. Throughout this document, transmission elements, groups, or element types with a higher priority than other elements, groups, or types are denoted with a greater-than symbol ">". Hence if TT #A has a higher priority than TT #B, this will be denoted as "TT #A>TT #B"; if transport channel 1 ("CH1") has a higher priority than transport channel 2 ("CH2"), this will be denoted as "CH1>CH2"; if CH2 has higher priority than transmission signal 3 ("SIG3") this will be denoted as "CH2>SIG3"; if transmission elements in cell group 1 ("CG1") have a higher priority than transmission elements in CG2 this will be denoted as "CG1>CG2", etc. The transport channels and transmission signals include, for example, PRACH, PUCCH, PUSCH, SRS, DMRS (demodulation reference signal), PUSCH with certain uplink control information (UCI) multiplexed, PUSCH without multiplexed UCI, PUCCH with certain uplink control information (UCI) multiplexed, etc.

As discussed above, the transmission types can have different priorities. In some embodiments (case #1), if transmission type A ("TT #A") has a higher priority than transmission type B ("TT #B"), then all the transport channels and transmission signals within TT #A can be designated to have a higher priority than all the transport channels and transmission signals within TT #B. For example, consider the case where TT #A contains CH1, CH2, SIG3, and SIG4 with the priority rule (CH1>CH2>SIG3>SIG4), and TT #B contains the same transport channels and transmission signals with the same priority rule (CH1>CH2>SIG3>SIG4). If TT #A>TT #B, the overall priority rule considering the transmission type priorities and the channel/signal priorities would be: TT #A_CH1>TT #A_CH2>TT #A_SIG3>TT #A_SIG4>TT #B_CH1>TT #B_CH2>TT #B_SIG3>TT #B_SIG4, where "TT #A_CH1" denotes transport channel 1 of transmission type A, TT #B_SIG4 denotes transmission signal 4 of transmission type B, etc. In different embodiments, such priority rules (e.g., priority of channels or signals within the same transmission type or priority of different transmission types) can be predefined in the system or can be semi-statically or dynamically configured by the base station (e.g., the base station can indicate the transmission type of a certain transmission channel or transmission signal through higher layer signaling, through downlink control information (DCI), etc.). Additionally, transmission signals or transport channels can have the same or different priority ordering in different transmission types. For example, in TT #A SRS could have a higher priority than DMRS, but in TT #B DMRS could have a higher priority than SRS. In some embodiments (case #2), only some channels or signals (e.g., channel set #1) are configured with a transmission type, the other channels or signals (e.g., channel set #2) do not belong to any transmission type. In this case, if transmission type #1 has higher priority than transmission type #2, only channel set #1 belonging to type #1 would have a higher priority than channel set #1 belonging to type #2. The priority of channel set #2, would have nothing to do with the priority ordering of different transmission types.

For UEs in NR-NR DC mode that are scheduled to transmit multiple UL channels or signals (e.g., transmission type A UL channel1 or signal1 (TT #A_CH1/SIG1)) 310, and transmission type B UL channel2 or signal2 (TT #B_CH2/SIG2) 320), if there is an overlap in time (e.g., overlap T 315) in the scheduled UL allocation, the UE can use the priority rules described above to determine how to allocate transmit power to the uplink channels and signals. For example, if TT #A>TT #B, the UE can preferentially allocation power to TT #A_CH1/SIG1 310 relative to the power allocation for TT #B_CH2/SIG2 320. In some embodiments, when there is limited power available for UL transmission, the UE can drop the transmission of TT #B_CH2/SIG2 or otherwise reduce the power allocated to transmit TT #B_CH22/SIG2.

1.2 Representative Embodiments for Specific Transport Channels or Transmission Signals Used for Different Transmission Types In some embodiments where the system supports multiple transmission types as described above, which channels or signals fall under which transmission type can be predefined by the system or semi-statically configured by the base station or dynamically indicated by the base station. The definition or configuration of a transport channel or transmission signal under different transmission types can be the same or different.

Case 1: Transport Channels or Transmission Signals are the Same for Different Transmission Types For example, if TT #A and TT #B both include CH1>CH2>CH3>CH4, where TT #A>TT #B, and the system pre-defines or the BS configures CH2 and CH3 under TT #A, and CH2 and CH3 under TT #B as specific transport channels, the priority order for a particular/specific transport channel would be TT #A_CH2>TT #A_CH3>TT #B_CH2>TT #B_CH3. In this case, the priority ordering for TT #A_CH1, TT #A_CH4, TT #B_CH1, and TT #B_CH4 is independent of the transmission type to which it belongs.

Case 2: Transport Channels or Transmission Signals are Different for Different Transmission Types For example, if TT #A and TT #B both include CH1>CH2>CH3>CH4, where TT #A>TT #B, and the system pre-defines or the BS configures CH2 and CH3 under TT #A, but configures CH1 and CH4 under TT #B as specific transport channels, the priority order for a particular/specific transport channel would be TT #A_CH2>TT #A_CH3>TT #B_CH1>TT #B_CH4. In this case, the priority ordering for TT #A_CH1, TT #A_CH4, TT #B_CH2, and TT #B_CH3 is independent of the transmission type to which it belongs. Although the above examples in case 1 and case 2 use transport channels, the same rules apply to transmission signals or to a mix of transport channels and transmission signals.

1.3 Representative Embodiments for Transport Channels or Transmission Signals with No Transmission Types As described above, for transport channels or transmission signals of a certain transmission type, the priority order can be determined first by considering the transmission type priority then considering the priority of the different transport channels or signals within the same transmission type. However, in some embodiments, not all transmission channels or signals are assigned a transmission type. For example, if the priority order of transport channels and transmission signals is CH1>CH2>SIG3>SIG4 but only CH2 and SIG3 are assigned transmission types of either TT #A or TT #B. If TT #A>TT #B, the priority ordering is at least TT #A_CH2>TT #A_SIG3>TT #B_CH2>TT_B_SIG3. The priority of CH1 and SIG4 is independent of the transmission type and only depends on the channel/signal priority hence the priority ordering can be: CH1>TT #A_CH2>TT #A_SIG3>TT #B_CH2>TT_B_SIG3>SIG4.

1.4 Representative Embodiments for Signaling the Transmission Type of UL Channels or Signals to a UE In some embodiments, for a semi-statically configured UL transport channel or transmission signal, the transmission type can be indicated by, for example:

The base station can semi-statically configure the transmission type to which the UL channel or signal belongs. For example, a transmission type indication field can be configured by higher layer signaling and transmitted to a UE. In some embodiments, the BS does not indicate a transmission type to a UE in which case the UL channels or signals can be configured to a default transmission type. The default transmission type can have a preconfigured priority (e.g., a priority lower than specifically assigned transmission types) or the priority of the default transmission type can be determined by other parameters.

The base station can dynamically indicate the transmission type to which the UL channel or signal belongs explicitly. The transmission type can be indicated in a downlink control information (DCI) that activates or deactivates the UL channel or signal. For example, a transmission type indication field can be added to the DCI, which may be 1 or 2 bits. Additionally, or alternatively, an existing field in the DCI can be reused as a transport type indication. On receiving the DCI, the UE can decode the transmission type indication field to determine the transmission type of the UL channel or signal activated or deactivated by the DCI.

The base station can use a combination of semi-static signaling, predefined parameters, and dynamic signaling to indicate transmission type. DCI can include "SRS resource indicator" field (SRS Resource Indicator), and the length of this field can be x bit. In some embodiments, this x-bit SRS resource indicator field can be expanded to y bits. If x bit can indicate X candidate SRI values, y bit can indicate Y candidate SRI values, then the expanded Y-X candidate SRI values can correspond to a second transmission type, and the existing X candidate SRI values can correspond to a first transmission type. For example, the first transmission type can be enhanced mobile broadband (eMBB) type, and the second transmission type can be ultra-reliable low latency communication (URLLC) type. Which candidate SRI values corresponds to the first transmission type, and which candidate SRI values corresponds to the second transmission type, can be predefined by the system or can be configured semi-statically by the base station. For example, the first half of the candidate SRI values can correspond to eMBB transmission type, and the latter half of the candidate SRI value can correspond to URLLC transmission type.

The base station can dynamically indicate the transmission type to which the UL channel or signal belongs implicitly. The DCI that activates or deactivates the UL channel or signal can implicitly indicate the transmission type to which the UL channel or signal belongs. For example, different properties of a specific DCI can be used to determine the transmission type of the corresponding channel or signal that was activated or deactivated by the specific DCI. That is, if a specific DCI has a specific property, feature, or is obtained in a specific manner, this can indicate that the corresponding channel or signal is of TT #A and if that DCI has a different property, feature or is obtained in a different manner it can indicate that the corresponding channel or signal is of TT #B, etc. The DCI properties or features can include, for example:

DCI blindly detected on a specific search space;
DCI blindly detected on specific monitoring occasion;
DCI blindly detected on a specific control resource set (CORESET);
DCI using a specific DCI format;
DCI using a specific DCI size;
DCI blindly detected in a specific beam direction;
DCI blindly detected on a specific carrier or bandwidth part (BWP).

The transmission type to which the UL channels or signals belong can be predefined by the system.

For an UL transport channel or transmission signal that is not semi-statically configured, the transmission type can be indicated by, for example:

The DCI that schedules the UL channel or signal can explicitly indicate the transmission type to which the UL channel or signal belongs. For example, a transmission type indication field can be added to the DCI, which can be 1 or 2 bits. Alternatively, or additionally, an existing field in the DCI can be reused as a transmission type indication. After receiving the DCI, the UE reads the field, and learns the transmission type to which the UL channel or signal scheduled by the DCI belongs.

The DCI that schedules the UL channel or signal can implicitly indicate the transmission type to which the UL channel or signal belongs. For example, different properties of a specific DCI can be used to determine the transmission type of the corresponding channel or signal that was scheduled by the specific DCI. That is, if a specific DCI has a specific property, feature, or is obtained in a specific manner, this can indicate that the corresponding scheduling channel or signal is of TT #A and if that DCI has a different property, feature or is obtained in a different manner it can indicate that the channel or signal is of TT #B, etc. The DCI properties or features can include, for example:

DCI blindly detected on a specific search space;
DCI blindly detected on specific monitoring occasion;
DCI blindly detected on a specific control resource set (CORESET);
DCI using a specific DCI format;
DCI using a specific DCI size;
DCI blindly detected in a specific beam direction;
DCI blindly detected on a specific carrier or bandwidth part (BWP).

Figure 4:
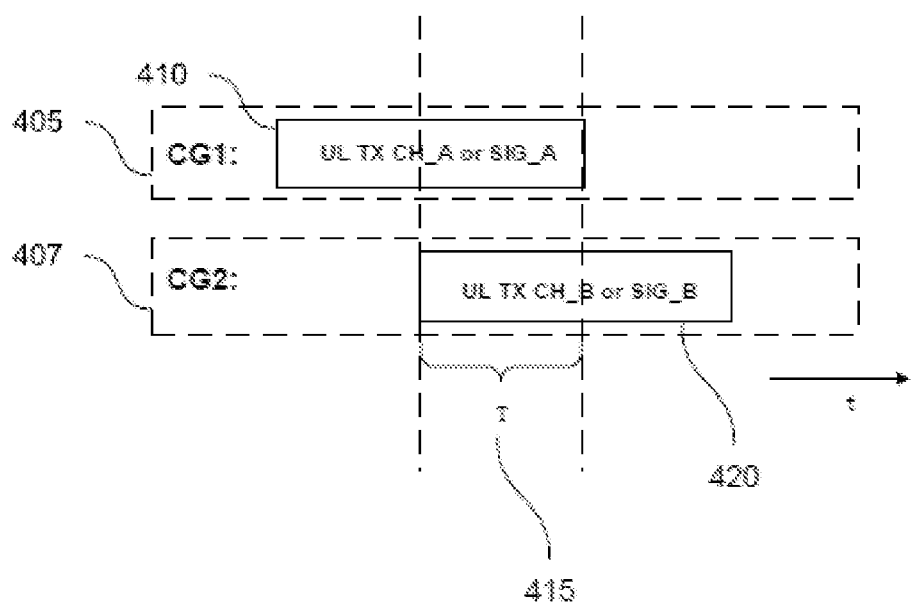
FIG. 4 shows an example block diagram illustrating a time overlap of different transport channels or transmission signals in different cell groups.

2 Determining Priority of Transport Channel or Transmission Signal Based on Cell Group Type or Cell Type FIG. 4 shows an example block diagram illustrating a time overlap of different transport channels or transmission signals in different cell groups. For example, UL transport channel A ("CH_A") or transmission signal A ("SIG_A") 410 in cell group 1 (CG1) 405 can overlap for a time period T 415 with UL channel B ("CH_B") or signal B ("SIG_B") 420 in cell group 2 (CG2) 407. Each of the CH_A/SIG_A or CH_B/SIG_B represents one or more transport channels or transmission signals (CH1 or SIG1, CH2 or SIG2, CH3 or SIG3, etc.) (not shown in FIG. 4). The system predefines or the base station semi-statically configures or the base station dynamically configures the priority order of the different transport channels or signals as CH1/SIG1>CH2/SIG2>CH3/SIG3 . . . , etc. CG1 405 can include a primary cell (PC) (PC_CG1) and a secondary cell (SC) (SC CG1) (not shown in FIG. 4). Similarly, CG2 407 can include a primary cell (PC_CG2) and a secondary cell (SC CG2) (not shown in FIG. 4). One of the CG1 or CG2 can be configured as a master cell group (MCG) and the other as a secondary cell group (SCG). In some embodiments, additional cell groups (CG3, CG4, . . . ) can likewise contain several cells where one is designated a primary cell and the rest as secondary cells within that CG.

2.1 Representative Embodiments for Prioritizing Multiple Transport Channels or Transmission Signals of Multiple Cell Groups or Multiple Cells When an overlap, e.g., overlap T 415 occurs, the base station can determine the priority of CH_A/SIG_A relative to CH_B/SIG_B (i.e., the priority of CH1/SIG1, CH2/SIG2, etc., within CH_A/SIG_A or CH_B/SIG_B) based on, for example:

The attributes or type of the CG within which CH_A/SIG_A or CH_B/SIG_B is contained. For example, whether the CG is a master cell group (MCG) or a secondary cell group (SCG). In some embodiments, the transport channels or transmission signals in MCG can be assigned a higher priority than the channels or signals in SCG (i.e., MCG>SCG).

The attributes or type of the cell within which CH_A/SIG_A or CH_B/SIG_B is contained. For example, whether the cell is a primary cell (PC) or a secondary cell (SC). In some embodiments, the transport channels or transmission signals in PC can be assigned a higher priority than the channels or signals in SC (i.e., PC>SC).

The priority order of the transport channels or signals.

The transmission starting time of CH_A/SIG_A relative to that of CH_B/SIG_B. In some embodiments, the transport channels or transmission signals with an earlier starting time can be assigned a higher priority. For example, in FIG. 4, CH_A/SIG_A has an earlier starting time than CH_B/SIG_B and would therefore be assigned a higher priority.

Figure 5:
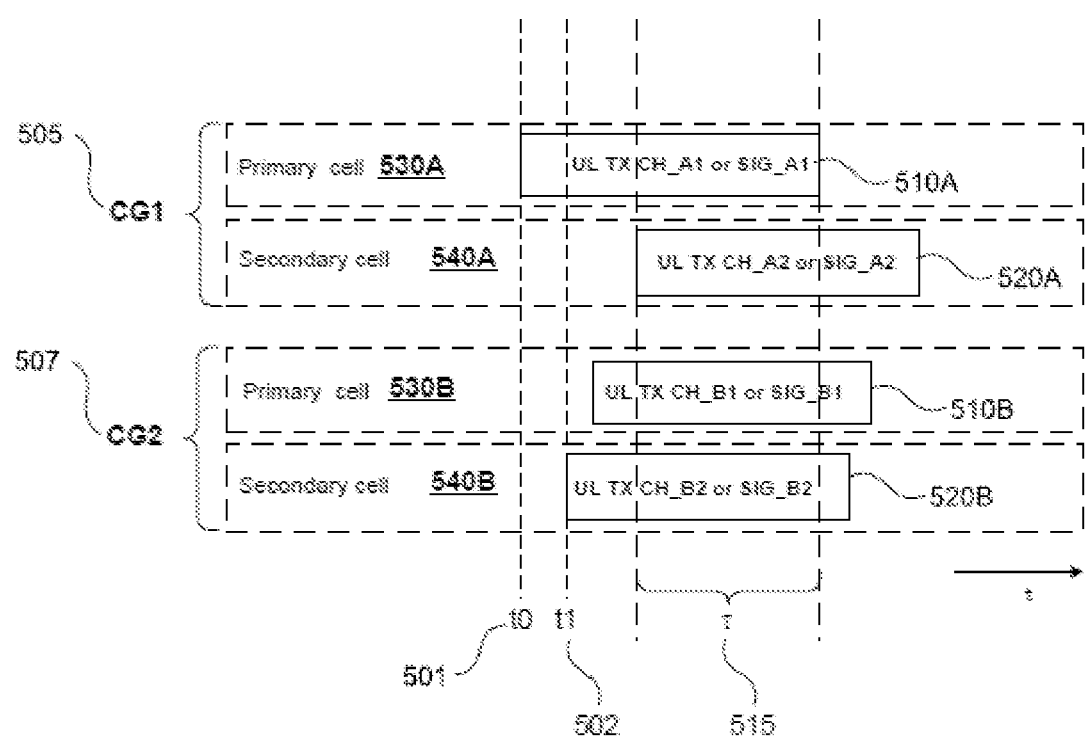
FIG. 5 shows an example block diagram illustrating a time overlap of different transport channels or transmission signals in different cells of different cell groups.

2.2 Representative Embodiments for Prioritizing Transport Channels or Transmission Signals Based on Priority of Cell Group FIG. 5 shows an example block diagram illustrating a time overlap of different transport channels or transmission signals in different cells of different cell groups. For example, UL transport channel A1 ("CH_A1") or transmission signal A1 ("SIG_A1") 510A in primary cell (PC) 530A of cell group 1 (CG1) 505 can overlap for a time T 515 with:
- CH_A2/SIG_A2 520A of secondary cell (SC) 540A in CG1 505;
- CH_B1/SIG_B1 510B of PC 530B in CG2 507; and
- CH_B2/SIG_B2 520B of SC 540B in CG2 507.

Each of the CH_A1/SIG_A1, CH_A2/SIG_A2, CH_B1/SIG_B1, CH_B2/SIG_B2 represents one or more transport channels or transmission signals (CH1 or SIG1, CH2 or SIG2, CH3 or SIG3, etc.) (not shown in FIG. 5). The system predefines or the base station semi-statically configures or the base station dynamically configures the priority order of the different transport channels or signals as CH1/SIG1>CH2/SIG2>CH3/SIG3 . . . , etc. One of the CG1 or CG2 can be configured as a master cell group (MCG) and the other as a secondary cell group (SCG). In some embodiments, additional cell groups (CG3, CG4, . . . ) can likewise contain several cells where one is designated a primary cell and the rest as secondary cells within that CG.

When an overlap, e.g., overlap T 515 occurs, the base station can determine the priority ordering of CH_A1/SIG_A1, CH_A2/SIG_A2, CH_B1/SIG_B1, CH_B2/SIG_B2 (i.e., the priority of the corresponding CH1/SIG1, CH2/SIG2, etc.) based on, one of more of the following criteria:

2.2.1 Priority Based on Priority of Cell Group which is Based on the Highest Priority of Transport Channels or Transmission Signals within Each Cell Group In some embodiments, the BS or UE can determine relative priorities of the different cell groups by considering the relative priorities of the transport channels or transmission signals within each cell group. For example, CH_A1/SIG_A1 (510A in FIG. 5) and CH_A2/SIG_A2 520A can contain channels and signals prioritized as CH1/SIG1>CH2/SIG2>CH3/SIG3 . . . , etc. Based on this prioritization of the constitute channels and signals, it can be determined if CH_A1/SIG_A1 510A has a higher priority than CH_A2/SIG_A2 520A in CG1 505. Likewise, it can be determined if CH_B1/SIG_B1 510B has a higher priority than CH_B2/SIG_B2 520B in CG2 507. The higher priority channel or signal in CG1 can then be compared with the higher priority channel or signal in CG2 (i.e., the highest priority channels or signals in a cell group compared against other highest priority channels or signals in other cell groups). If, for example, it is determined that CH_B2/SIG_B2 520B has higher priority than CH_B1/SIG_B1 510B in CG2, and CH_A1/SIG_A1 510A has higher priority than CH_A2/SIG_A2 520A in CG1, CH_B2/SIG_B2 520B would be compared with CH_A1/SIG_A1 510A. If, from this comparison it is determined that CH_B2/SIG_B2 520B has higher priority than CH_A1/SIG_A1 510A, for example, then CG2 would be assigned a higher priority than CG1. That is, all the channels and signals in CG2 (including CH_B1/SIG_B1 510B and CH_B2/SIG_B2 520B) would have a higher priority (e.g., preferential UL power allocation) than all the channels and signals in CG1 (including CH_A1/SIG_A1 510A and CH_A2/SIG_A2 520A).

2.2.2 Priority Based on Priority of Cell Group which is Based on Priority of Transport Channels or Transmission Signals within the Primary Cell of Each Cell Group In some embodiments, the relative priority of the cell groups can be determined based on the relative priority of transport channels or transmission signals on the primary cell of each cell group. For example, if it is determined that CH_B1/SIG_B1 (510B in FIG. 5) of primary cell 530B in CG2 507 has a higher priority than CH_A1/SIG_A1 510A of primary cell 530A in CG1 505, then it can be determined that CG2>CG1. Hence, when the UE allocates UL power, priority would be given to all transport channels and transmission signals in CG2 relative to those in CG1.

2.2.3 Priority Based on Priority of Cell Group which is Based on Relative Starting Times of Transport Channels or Transmission Signals within the Cell Group In some embodiments, the relative priority of the cell groups can be determined based on the relative start times of the transport channels or transmissions signals within the cell groups. For example, within CG1 (505 in FIG. 5), CH_A1/SIG_A1 510A has an earlier starting time (t0) (marker 501) than CH_A2/SIG_A2 in CG1. Similarly, CH_B2/SIG_B2 520B has an earlier starting time (t1) (marker 502) than CH_B1/SIG_B1 in CG2. Therefore, the priority of transport channels or transmission signals in CH_A1/SIG_A1 can be compared against those in CH_B2/SIG_B2 to determine which has higher priority. If, for example, the channels or signals in CH_A1/SIG_A1 have higher priority than those in CH_B2/SIG_B2, it can be determined that CG1 has higher priority that CG2 (i.e., CG1>CG2). Hence, when the UE allocates UL power, priority would be given to all transport channels or transmission signals in CG1 relative to those in CG2. In some embodiments, CH_A1/SIG_A1 510A in CG1 505 having an earlier start time than any of the CH/SIGs in CG2 507 can mean that CG1>CG2 and hence priority would be given to all the channels and signals in CG1.

2.3 Representative Embodiments for Prioritizing Transport Channels or Transmission Signals Based on Priority of Cell In some embodiments, the priority order of cells (primary cells and secondary cells of CG1 and CG2) can be used to determine the priority of transport channels or transmissions signals within the cells. For example, if the channels and signals in secondary cell 540B of CG2 507 has higher priority than the rest of the primary cells 510A and 510B or the secondary cell 540A, then the channels and signals within secondary cell 540B would be given the highest priority for power allocation.

In some embodiments, the start times are used to determine priority. For example, in FIG. 5 the priority based on start times would be CH_A1/SIG_A1>CH_B2/SIG_B2>CH_B1/SIG_B1>CH_A2/SIG_A2.

In some embodiments, a combination of the methods described above can be used to determine the priority of transport channels or transmission signals.

3 Representative Embodiments for Allocating Limited UL Power Based on Priorities and Allocation Thresholds In some embodiments, the BS can semi-statically configure a power allocation threshold P1 for a carrier set 1, and a power allocation threshold P2 for a carrier set 2, etc. A carrier set can include one carrier, multiple carriers, or a cell group. For example, if as described in the embodiments above, it is determined that the priority of the transport channels or transmission signals on the carrier set 1 is higher than the priority of the channels or signals on carrier set 2, and P1+P2 is greater than the total power that the UE can transmit on the two sets of carriers, the UE can change the power thresholds P1 and P2. For example, the UE can allocate P1 on carrier set 1 channels/signals and allocate the residual power (i.e., "total power available for transmission–P1") to carrier set 2 channels/signals. For example, the UE may perform this operation in case that the UE determines that there are possible overlapping transport channels or transmission signals on carrier set 1 and carrier set 2, such as there are overlapping UL or Flexible symbols according to TDD-UL-DL-Configurations, or such as there are overlapping UL transport channels or transmission signals according to semi-static configuration or DCI. In some embodiments, this may be used to limit the condition under which CG2 changes its threshold from P2 to P_TOTAL−P1.

In some embodiments, rather than allocating the entire P1 to carrier set 1, a portion of P1 can be allocated such that the residual power allocated to carrier set is sufficient for the purpose of the channels/signals in carrier set 2 (e.g., power allocated to SRS not too low that BS cannot use it for channel sounding, or DMRS not too low that BS cannot use it for coherent demodulation, etc.). In this approach, because carrier set 1 has higher priority than carrier set 2, it would still receive a higher percentage of the total available power than carrier set 2. This approach can greatly improve performance vs. other approaches such as discarding (or otherwise providing too little power) to lower priority transport channels or transmission signals.

Some example embodiments may be described using the following clauses.

Clause 1. A wireless device (e.g., UE) allocates uplink transmission power to a plurality of transmission elements (e.g., transport channels or transmission signals) based on a priority of each transmission element in the plurality of transmission elements. The transmission elements can be one or more of a physical random access channel (PRACH), a physical uplink control channel (PUCCH), a physical uplink shared channel (PUSCH), a sounding reference signal (SRS), a demodulation reference signal (DMRS), a PUSCH with multiplexed uplink control information (UCI), or a PUSCH without multiplexed UCI, a PUSCH with multiplexed specific uplink control information (UCI), a PUCCH with specific uplink control information (UCI), etc. The plurality of transmission elements comprises one or more of a transport channel or a transmission signal in which one or more transmission time domain resources on one or more cell groups overlap (e.g., FIG. 5 CG1 505 and CG3 507 overlaps at time T). Additional details are provided in sections 1.1 and 2.2 above.

Clause 2. The priority of each transmission element in the plurality of transmission elements is based on a transmission type of the transmission element where different transmission types can have different priorities. Thus, by determining the priority order of the transmission types, the UE or BS can determine the priority order of all the transmission elements (i.e., all the channels or signals) designated with that transmission type. Additionally, a first plurality of transmission elements can belong to a first channel set (i.e., certain channels or signals can be designated into a first set or first grouping), a second plurality of different transmission elements can belong to a second channel set (i.e., different channels or signals are designated with different channel sets or groupings), etc. Some of the channel sets or groups are not configured with transmission types (e.g., only the first channel set might be configured with a transmission type). As a result, the priority of the channels or signals in a channel set that is not assigned a transmission type would not be based on the transmission type priority ordering. Additional details are provided in section 1 above.

Clause 3. The transmission type can be predefined by a system in which the wireless device operates (e.g., the network) or it can be semi-statically configured by a wireless node or it can be dynamically configured (e.g., the transmission type of the transmission element can be based on a transmission type indication field in a downlink control information (DCI) signal associated with the transmission element) by a wireless node. Additional details are provided in section 1.4 above.

Clause 4. The wireless device determines the transmission type of the transmission element based on a property or feature of the DCI signal associated with the transmission element (i.e., the DCI signal used to activate or deactivate the corresponding channel or signal). The property or feature of the DCI signal can be, for example, a search space where the DCI signal was blindly detected, a specific monitoring occasion where the DCI signal was detected, a control resource set (CORESET) where the DCI signal was detected, a format of the DCI signal, a size of the DCI signal, a beam direction in which the DCI signal was detected, a specific carrier on which the DCI signal was detected, a bandwidth part (BWP) on which the DCI signal was detected, etc. Additional details are provided in section 1.4 above.

Clause 5. The priority of each transmission element in the plurality of transmission elements can be based on a predefined priority configuration, a semi-static priority configuration, a dynamic priority configuration, etc. These configurations can be known by the UE in advance, transferred through higher layer signal (e.g., RRC signaling), sent through DCI, or otherwise dynamically communicated to the UE by the BS. Additional details are provided in section 1 above.

Clause 6. The priority of each transmission element in the plurality of transmission elements can based on a start time of the transmission element. Additional details are provided in section 2.1 and 2.2.3 above.

Clause 7. The priority of each transmission element in the plurality of transmission elements can be based on:
    a cell type of the transmission element (e.g., if the cell in which the channel or signal is in is a primary cell (PC) or a secondary cell (SC));
    a cell group type of the transmission element (e.g., if the cell group is a master cell group (MCG) and a secondary cell group (SCG);
    a priority of a cell group of the transmission element (e.g., if CH1 is to be transmitted in CG1 and CH2 is to be transmitted in CG2, CH1>CH2 if CG1>CG2). The priority of the cell group can be determined by:
        comparing a priority of a highest priority transmission element in the cell group with a priority of a highest priority transmission element in one or more different cell groups;
        comparing a priority of a plurality of transmission elements in a primary cell of the cell group with a priority of a plurality of transmission elements in primary cells of one or more different cell groups (i.e., comparing priorities of channels or signals only in primary cells to determine which cell group has higher priority);

comparing a transmission start time of a plurality of transmission elements of the cell group with transmission start times of a plurality of transmission elements in one or more different cell groups.

Additional details are provided in section 2 above.

Clause 10. Allocating transmission power to the plurality of transmission elements by receiving (or otherwise determining, e.g., from a BS) a power allocation threshold P1 for a first transmission element and a power allocation threshold P2 for a second transmission element (and P3 for third transmission element, etc.). In some embodiments, a power allocation threshold P1 can be configured to a first transmission element set (i.e., a group of one or more transmission elements, e.g., a CG) and a power allocation threshold P2 to a second transmission element set, etc. Determining, by the UE, a total transmit power available as P_TOTAL. That is, the UE can determine if it has sufficient available power to allocate to all the scheduled channels or signals. If the UE maybe does not have sufficient available power, i.e., when P1+P2 is greater than P_TOTAL, and the first transmission element (or first transmission element set) has a higher priority than the second transmission element (or second transmission element set), the UE allocates power to the first transmission element (or first transmission element set) based on the power allocation threshold P1, but allocates power to the second transmission element (or element set) based on a power allocation threshold P_TOTAL−P1 (for P1 less than P_TOTAL, i.e., UE has enough power to meet the power allocation threshold for at least one channel or signal or channel set). The residual power remaining after allocating power to the higher priority transmission element(s) or sets goes to the lower priority transmission element(s)) or sets, where the residual power threshold is the difference between the total power available to allocate to the plurality of transmission elements or sets (i.e., total power needed for all the concurrent UL transmissions) and the total power allocated to the higher priority transmission elements or sets based on the provided allocation thresholds.

Clause 11. The wireless device can also modify the power allocation threshold of one or more lower priority transmission elements based on a semi-static configuration. For example, a UE can distribute P_TOTAL among the transmission elements based on priority with higher priority elements getting a larger percentage of P_TOTAL than lower priority transmission elements. This semi-static configuration can be received from a wireless node (e.g., a BS).

The wireless device (e.g., UE) or wireless node (e.g., base station) can include a processor configured to implement a method recited in any one or more of clauses above. Additionally, the UE or base station can include a computer program product comprising a computer-readable program medium having processor executable instructions stored thereon, the instructions, when executed by a processor, causing the processor to implement a method recited in any one or more of the clauses above.

Figure 6:
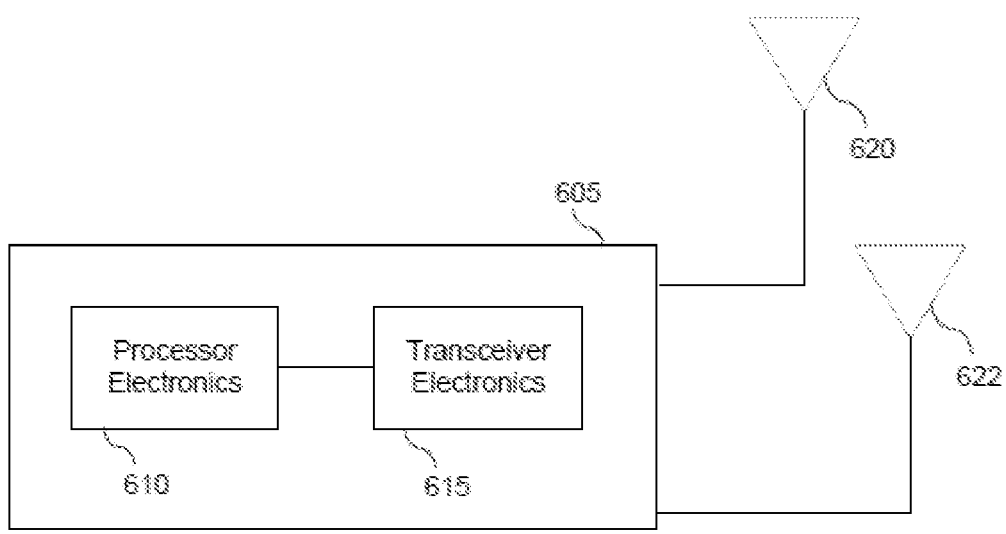
FIG. 6 is a block diagram representation of a portion of an apparatus.

FIG. 6 is a block diagram representation of a portion of an apparatus, in accordance with some embodiments of the presently disclosed technology. An apparatus 605, such as a base station or a wireless device (or UE), can include processor electronics 610 such as a microprocessor that implements one or more of the techniques presented in this document. The apparatus 605 can include transceiver electronics 615 to send and/or receive wireless signals over one or more communication interfaces such as antennas 620 and 622. The apparatus 605 can include other communication interfaces for transmitting and receiving data. Apparatus 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the apparatus 605.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
    determining, by a wireless device in a dual-connectivity mode including two or more links with two or more cell groups of a same communication technology, a priority of each transmission element of a plurality of transmission elements, wherein the plurality of transmission elements comprises one or more of a transport channel or a transmission signal, wherein a respective priority of each transmission element is based on a corresponding transmission type of the respective transmission element, and wherein at least one of the transmission types is assigned to a first transport channel and a first transmission signal;
    determining, by the wireless device, a total power allocated in the dual-connectivity mode, for scheduled concurrent uplink grants within a time overlap; and
    allocating, by the wireless device, transmission power of the total power, to respective transmission elements of the plurality of transmission elements for transmission via respective links of the respective cell groups, based on the priority of each transmission element, for the time overlap.

2. The method of claim 1, wherein the one or more of the transport channel or the transmission signal comprises one or more of a physical random access channel (PRACH), a physical uplink control channel (PUCCH), a physical uplink shared channel (PUSCH), a sounding reference signal (SRS), a demodulation reference signal (DMRS), a PUSCH with multiplexed uplink control information (UCI), a PUSCH without multiplexed UCI, a PUSCH with multiplexed specific UCI, or a PUCCH with specific UCI.

3. The method of claim 1, wherein the plurality of transmission elements comprises one or more of a transport channel or a transmission signal in which one or more transmission time domain resources on one or more of the cell groups overlap.

4. The method of claim 1, wherein the transmission type is predefined by a system in which the wireless device operates or is semi-statically configured by a wireless node.

5. The method of claim 1, wherein a first plurality of transmission elements belongs to a first channel set, a second plurality of different transmission elements belongs to a second channel set, and only the first channel set is configured with a transmission type.

6. The method of claim 1, wherein the wireless device determines the transmission type of the transmission element based on a transmission type indication field in a downlink control information (DCI) associated with the transmission element.

7. The method of claim 1, wherein the wireless device determines the transmission type of the transmission element based on a SRS Resource Indicator field in a downlink control information (DCI) associated with the transmission element.

8. The method of claim 1, wherein the wireless device determines a mapping between the transmission type and one or more SRS Resource Indicator values based on a rule predefined by the system in which the wireless device operates or a parameter semi-statically configured by a wireless node.

9. The method of claim 1, wherein the wireless device determines the transmission type of the transmission element based on a property of the DCI associated with the transmission element, wherein the property of the DCI includes at least one of a search space where the DCI was blindly detected, a specific monitoring occasion where the DCI signal was detected, a control resource set (CORESET) where the DCI signal was detected, a format of the DCI signal, a size of the DCI signal, a beam direction in which the DCI signal was detected, a specific carrier on which the DCI signal was detected, and a bandwidth part (BWP) on which the DCI signal was detected.

10. The method of claim 1, wherein the priority of each transmission element in the plurality of transmission elements is based on at least one of a predefined priority configuration, a semi-static priority configuration, and a dynamic priority configuration.

11. The method of claim 1, wherein the priority of each transmission element in the plurality of transmission elements is based on a starting time of the transmission element.

12. The method of claim 1, wherein the priority of each transmission element in the plurality of transmission elements is based on a priority of a cell group of the transmission element.

13. The method of claim 12, wherein the priority of the cell group of the transmission element is determined by comparing a priority of a highest priority transmission element in the cell group with a priority of a highest priority transmission element in one or more different cell groups.

14. The method of claim 12, wherein the priority of the cell group of the transmission element is determined by comparing a priority of a plurality of transmission elements in a primary cell of the cell group with a priority of a plurality of transmission elements in primary cells of one or more different cell groups.

15. The method of claim 12, wherein the priority of the cell group of the transmission element is determined by comparing a transmission starting time of a plurality of transmission elements of the cell group with transmission starting times of a plurality of transmission elements in one or more different cell groups.

16. The method of claim 1, wherein allocating the transmission power to the plurality of transmission elements further comprises:
    receiving a power allocation threshold P1 for a first transmission element set and a power allocation threshold P2 for a second transmission element set;
    determining a total power available P_TOTAL to allocate to the first transmission element set and to the second transmission element set, collectively; and
    when P1+P2 is greater than P_TOTAL, P1 is less than P_TOTAL, and the first transmission element set has a higher priority than the second transmission element set, allocating power to the first transmission element set based on the power allocation threshold P1 and allocating power to the second transmission element set based on a power allocation threshold P_TOTAL−P1.

17. The method of claim 16, wherein the wireless device modifies the power allocation threshold of one or more lower priority transmission elements based on a semi-static configuration.

18. The method of claim 1, wherein the wireless device is a user equipment (UE), the wireless node is a base station (BS), and the transmission power is allocated for an uplink transmission.

19. A wireless communication apparatus in a dual-connectivity mode, comprising:
at least one processor configured to:
maintain, in the dual-connectivity mode, two or more links with two or more cell groups of a same communication technology;
determine a priority of each transmission element of a plurality of transmission elements, wherein the plurality of transmission elements comprises one or more of a transport channel or a transmission signal, wherein a respective priority of each transmission element is based on a corresponding transmission type of the respective transmission element, and wherein at least one of the transmission types is assigned to a first transport channel and a first transmission signal;
determine a total power allocated in the dual-connectivity mode, for scheduled concurrent uplink grants within a time overlap; and
allocate transmission power of the total power, to respective transmission elements of the plurality of transmission elements for transmission via respective links of the respective cell groups, based on the priority of each transmission element, for the time overlap.

\* \* \* \* \*